United States Patent [19]

Vogelgesang

[11] Patent Number: 5,306,056
[45] Date of Patent: Apr. 26, 1994

[54] BUMPER FOR VEHICLES
[75] Inventor: Harald-Werner Vogelgesang, Wurmberg, Fed. Rep. of Germany
[73] Assignee: Dr. Ing. H.C.F. Porsche AG, Fed. Rep. of Germany
[21] Appl. No.: 5,263
[22] Filed: Jan. 19, 1993
[30] Foreign Application Priority Data
   Jan. 24, 1992 [DE] Fed. Rep. of Germany ....... 4201839
[51] Int. Cl.$^5$ ............................................. B60R 19/04
[52] U.S. Cl. ..................................... 293/121; 293/132
[58] Field of Search ............... 293/121, 120, 132, 133; 425/500

[56] References Cited
U.S. PATENT DOCUMENTS
5,178,425 1/1993 Kumagai .......................... 293/120

FOREIGN PATENT DOCUMENTS
0376593 7/1990 European Pat. Off. .
0502648 9/1992 European Pat. Off. .
3020997 2/1982 Fed. Rep. of Germany .
3330397 3/1984 Fed. Rep. of Germany .
2304498 10/1976 France .
   6152 1/1984 Japan ................................... 293/132
 118548 7/1984 Japan ................................... 293/121

Primary Examiner—Robert R. Song
Attorney, Agent, or Firm—Evenson, McKeown, Edwards & Lenahan

[57] ABSTRACT

A bumper for vehicles, particularly motor vehicles, has a dimensionally stable support made of a light metal, which is profiled in an approximately U-shaped manner, and an elastic covering disposed in front of it, with impact absorbing flanges being arranged locally on the dimensionally stable support. In order to reduce the expenditures of time and cost during the manufacturing of the bumper, the impact absorbing flanges are constructed in one piece with the dimensionally stable support.

7 Claims, 2 Drawing Sheets

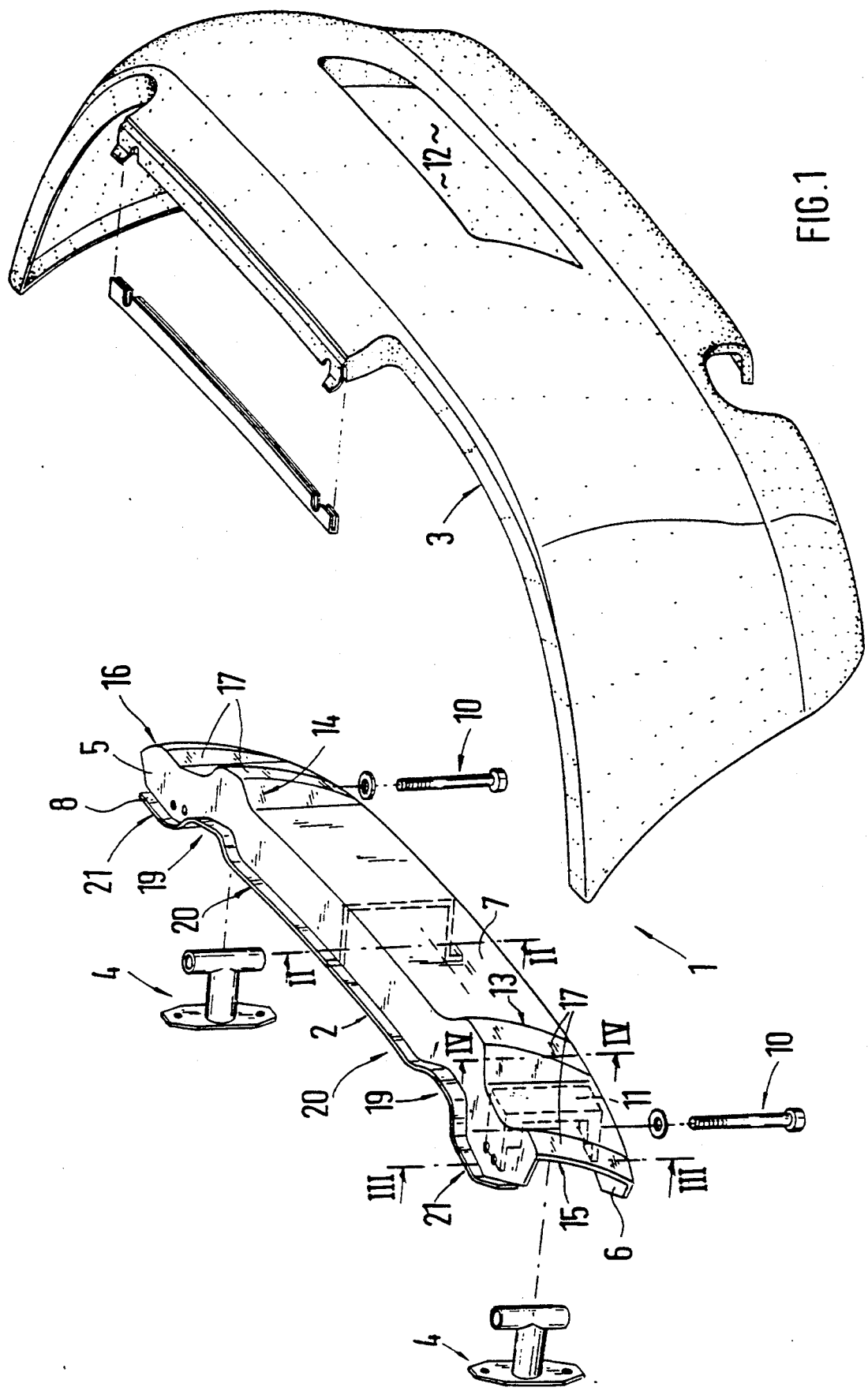

BUMPER FOR VEHICLES

BACKGROUND AND SUMMARY OF THE INVENTION

The present invention relates to a bumper for vehicles, particularly motor vehicles, having a dimensionally stable support made of a light metal, which, at least in sections, is profiled in an approximately U-shaped manner. An elastic covering is disposed in front of the support and forms the end area of the vehicle body, with impact absorbing flanges being arranged locally on the dimensionally stable support.

In a known vehicle of the initially mentioned type (Porsche 911 Carrera 2 and 4), one bumper respectively is provided in the forward area and in the rearward area and comprises a dimensionally stable support and an elastic covering which is disposed in front of it and forms the end area of the vehicle body. Impact absorbing flanges are provided locally on the dimensionally stable support which is formed by an extruded profile made of a light metal (aluminum alloy), for the bridging of the hollow space between the support and the covering. The impact absorbing flanges, which are made of plastic, are formed by separately manufactured parts which are connected with the support in an additional operation by means of riveting, screwing or the like. The mounting and manufacturing of these impact absorbing flanges, which have a useful function, cause considerable expenditures with respect to time and cost.

It is an object of the invention to reduce the time and cost expenditures in the case of a bumper of the above-mentioned type when the support and the impact absorbing flanges are manufactured.

This and other objects are achieved by the present invention which provides a bumper for a vehicle body comprising a dimensionally stable support and an elastic covering. The dimensionally stable support is made of a light metal, which at least in sections is profiled in an approximately U-shaped manner. The elastic covering is disposed in front of the support and forms an end area of the vehicle body. Impact absorbing flanges are arranged locally on the dimensionally stable support, and are integrally constructed in one piece with the dimensionally stable support.

Some principal advantages achieved by the present invention are that by the integration of the impact absorbing flanges into the support, a considerable saving of time and costs is achieved during the manufacturing of the support and of the impact absorbing flanges, and the recycling is improved.

In certain embodiments of the invention, the impact absorbing flanges are formed by stretch-forming the material of the aluminum support so that the separate manufacturing of the impact absorbing flanges and the subsequent mounting will no longer be necessary.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of a rear bumper of a vehicle constructed in accordance with an embodiment of the present invention.

DETAILED DESCRIPTION OF THE DRAWINGS

A bumper 1 for a vehicle, particularly a motor vehicle, comprises a dimensionally stable support 2 and an elastic covering 3 which is disposed in front of the support 2 and forms the end area of the vehicle body.

The support 2, which has an approximately U-shaped profile, is formed by an extruded profile made of a light metal such as an aluminum alloy, and is held in position on the vehicle body which is not shown in detail by way of supporting elements 4. The supporting elements 4 can be an impact absorbing tube, impact absorbing damper or the like.

Figure 2:
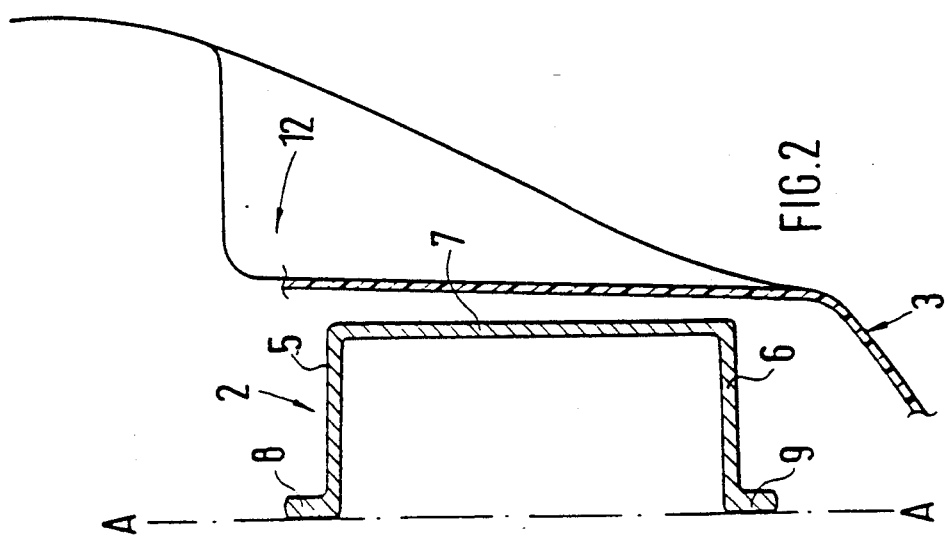
FIG. 2 is an enlarged sectional view according to Line II—II of FIG. 1.

According to FIG. 2, the open side of the U-shaped support 2 faces the body, in which case the two approximately horizontally aligned legs 5, 6 are connected with one another by a vertical wall section 7. In the top view, the support 2 has a curved shape.

Vertical webs 8, 9 are molded to the free ends of the legs 5, 6, the web 8 assigned to leg 5 extending upward, and the web 9 assigned to leg 6 being directed downward. The interior sides of the webs 8, 9 facing the body are situated on a common perpendicular plane A—A (FIG. 2). By means of a vertical fastening screw 10, each supporting element 4 is connected either directly with the support 2 or with an intermediate piece 11 of the support 2. The intermediate piece 11 is fastened to the support 2 by means of riveting, screwing or the like.

The dimensionally stable but elastic covering 3 is made of an appropriate plastic material, preferably a thermoplastic material, and is held in position in a known manner on the adjacent vehicle body (for example, by means of screws).

The covering 3 extends around laterally to adjacent wheel houses of the vehicle body and, in a central area of its transverse dimension, has a recess-type depression 12 for receiving a license plate which is not shown.

In order to fulfill the legal requirements which exist in the event of a pendulum impact, impact absorbing flanges 13, 14, 15, 16 are provided on both sides of the license plate and, in addition, on both laterally exterior end areas. These impact absorbing flanges 13, 14, 15, 16 bridge the space between the support 2 and the covering 3 that extends at a distance from the support 2.

Each impact absorbing flange 13, 14, 15, 16 is constructed in one piece with the dimensionally stable support 2. The impact absorbing flanges 13, 14, 15, 16 are formed by stretch-forming the material of the dimensionally stable support 2.

The manufacturing of the support with the integrated impact absorbing flanges 13, 14, 15, 16 takes place in such a manner that the extruded profile is first cut to the desired length, and then the bending of the extruded profile takes place according to the desired embossed course (in the top view). The extruded profile is then restored in the area of the impact absorbing flanges 13, 14, 15, 16.

The impact absorbing flanges 13, 14, 15, 16 protrude with respect to the adjacent sections of the support 2 and are adapted to the course of the covering 3 disposed in front. According to FIGS. 3 and 4, the impact surface 17 of each impact absorbing flange 13, 14, 15, 16 which faces the covering 3 extends approximately in parallel with respect to the adjacent section 18 of the covering 3 disposed in front, a gap being provided between the impact absorbing flange 13, 14, 15, 16 and the covering 3.

Figure 4:
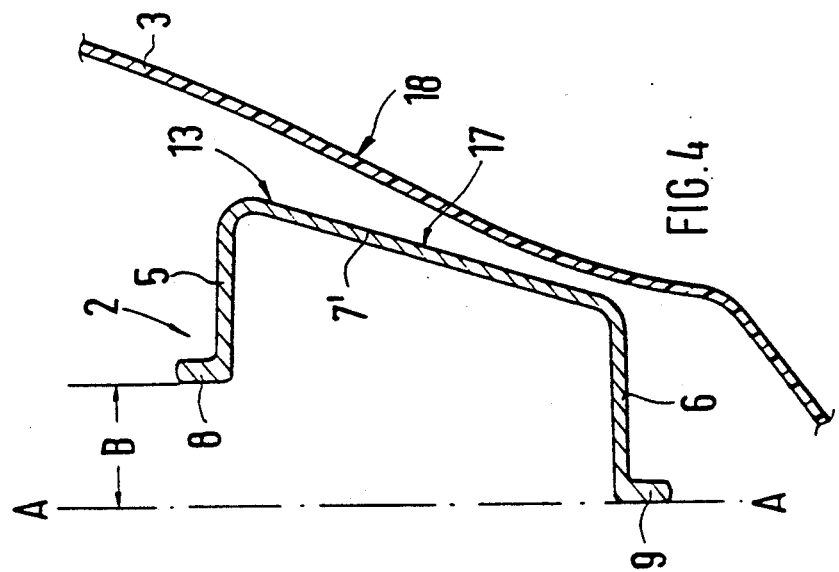
FIG. 4 is an enlarged sectional view according to Line IV—IV of FIG. 1.
Figure 3:
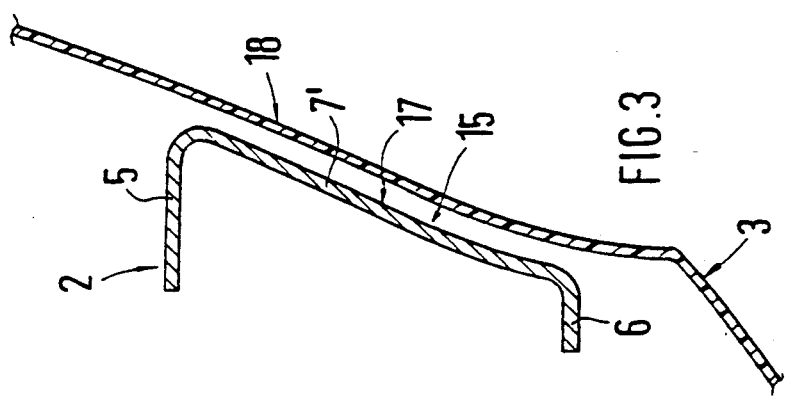
FIG. 3 is an enlarged sectional view according to Line III—III of FIG. 1.

Corresponding to FIGS. 3 and 4, the covering 3 has an oblique course in the area of the impact absorbing flanges 13, 14, 15, 16 which extends from the bottom interior to the top exterior (Section 18).

Correspondingly, an upper end area of the impact absorbing flange 13, 14, 15, 16 viewed in the longitudinal direction projects over a lower end area of the impact absorbing flange 13, 14, 15, 16 (offset B with respect to plane A—A).

FIG. 1 shows that the lower leg 6 of the support 2, after the bending, remains in its original form, whereas the upper leg 5 in the area of the impact absorbing flanges 13, 14, 15, 16 is displaced toward the outside so that, in the top view, a curved or tub-shaped transition 19 to adjacent sections 20, 21 of the support 2 is obtained.

However, the possibility also exists that the impact surface 17 of the impact absorbing flange 13, 14, 15, 16 extends in parallel to the original vertical wall section 7, the impact surface 17 protruding with respect to the wall section 7.

In addition, the impact surface 17 may also extend diagonally from the top interior to the bottom exterior if the covering 3 has such a course.

The possibility also exists of, in the case of a support 2 with a closed hollow profile, locally cutting free the rear wall of the support 2 and then restoring the profile in order to obtain an integrated impact absorbing flange 13, 14, 15, 16, as in the case of the illustrated embodiment.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A bumper for a vehicle body comprising:
   a dimensionally stable support made of a light metal which, at least in sections, is profiled in an approximately U-shaped manner; and
   an elastic covering disposed in front of the support and forms an end area of the vehicle body;
   wherein substantially vertically extending impact absorbing flanges are arranged locally on the dimensionally stable support, are integrally constructed in one piece with the dimensionally stable support.

2. A bumper according to claim 1, wherein the impact absorbing flanges are formed by stretch-forming material of the dimensionally stable support.

3. A bumper according to claim 1, wherein the impact surface of the impact absorbing flanges in a perpendicular direction, is approximately adapted to the course of the covering disposed in front of it.

4. A bumper according to claim 1, wherein substantially vertically extending impact absorbing flanges are arranged on the support on both sides of a license plate.

5. A bumper according to claim 1, wherein both free ends of the support have additional substantially vertically extending impact absorbing flanges which are constructed in one piece with the support.

6. A method of forming a bumper for a vehicle body comprising:
   forming a dimensionally stable support made of light metal by extrusion, the support being profiled in an approximately U-shaped manner in sections, where substantially vertically extending impact absorbing flanges are locally arranged on the support and integrally constructed in one piece with the support; and
   disposing an elastic covering in front of the support to form an end area of the vehicle body.

7. The method of claim 6, wherein the step of integrally constructing the impact absorbing flanges includes stretch-forming material of the support.

* * * * *